US011237022B2

(12) United States Patent
Mochizuki

(10) Patent No.: US 11,237,022 B2
(45) Date of Patent: *Feb. 1, 2022

(54) CORRECTION APPARATUS FOR ANGLE SENSOR, AND ANGLE SENSOR

(71) Applicant: TDK CORPORATION, Tokyo (JP)

(72) Inventor: Shinichirou Mochizuki, Tokyo (JP)

(73) Assignee: TDK CORPORATION, Tokyo (JP)

(*) Notice: Subject to any disclaimer, the term of this patent is extended or adjusted under 35 U.S.C. 154(b) by 141 days.

This patent is subject to a terminal disclaimer.

(21) Appl. No.: 16/747,883

(22) Filed: Jan. 21, 2020

(65) Prior Publication Data

US 2020/0182658 A1 Jun. 11, 2020

Related U.S. Application Data

(63) Continuation of application No. 15/819,618, filed on Nov. 21, 2017, now Pat. No. 10,571,308.

(30) Foreign Application Priority Data

Dec. 19, 2016 (JP) .............................. JP2016-245884

(51) Int. Cl.
*G01R 31/00* (2006.01)
*G01D 5/244* (2006.01)
*G01D 5/16* (2006.01)

(52) U.S. Cl.
CPC .......... *G01D 5/24476* (2013.01); *G01D 5/16* (2013.01)

(58) Field of Classification Search
USPC ..................... 324/207.11, 207.12, 207.15
See application file for complete search history.

(56) References Cited

U.S. PATENT DOCUMENTS

| 9,400,164 B2 | 7/2016 | Daubert et al. |
| 2012/0095712 A1 | 4/2012 | Komasaki et al. |
| 2014/0225597 A1 | 8/2014 | Romero et al. |

FOREIGN PATENT DOCUMENTS

| CN | 102445221 A | 5/2012 |
| JP | 2005-331496 A | 12/2005 |
| JP | 2006-090738 A | 4/2006 |
| JP | 2006-098068 A | 4/2006 |

OTHER PUBLICATIONS

May 30, 2019 Office Action issued in U.S. Appl. No. 15/819,618.
Translation of Oct. 9, 2019 Office Action issued in Chinese Patent Application No. 201711226453.6.

*Primary Examiner* — Vincent Q Nguyen
(74) *Attorney, Agent, or Firm* — Oliff PLC

(57) ABSTRACT

A correction apparatus for an angle sensor includes a correction processing unit, an indicator value generation unit, and a correction information determination unit. The correction processing unit performs correction processing on a plurality of detection signals to reduce an error of a detected angle value. The details of the correction processing are determined according to correction information. The indicator value generation unit generates, on the basis of the plurality of detection signals, an indicator value having a correspondence with the error of the detected angle value. The correction information determination unit generates an estimated indicator value using a function that takes one or more values each having a correspondence with the correction information as one or more variables, and determines the correction information by adaptive signal processing so as to reduce the difference between the indicator value and the estimated indicator value.

12 Claims, 6 Drawing Sheets

CORRECTION APPARATUS FOR ANGLE SENSOR, AND ANGLE SENSOR

CROSS REFERENCE TO RELATED APPLICATION

This application is a continuation application of U.S. application Ser. No. 15/819,618, filed Nov. 21, 2017, the contents of which are incorporated herein by reference.

BACKGROUND OF THE INVENTION

1. Field of the Invention

The present invention relates to a correction apparatus for correcting an error of an angle sensor that generates a detected angle value having a correspondence with an angle to be detected, and to an angle sensor including the correction apparatus.

2. Description of the Related Art

In recent years, angle sensors have been widely used in various applications, such as detection of the rotational position of a steering wheel or a power steering motor in an automobile. The angle sensors generate a detected angle value having a correspondence with an angle to be detected. Examples of the angle sensors include a magnetic angle sensor. A system using the magnetic angle sensor is typically provided with a magnetic field generation unit for generating a rotating magnetic field whose direction rotates in response to the rotation or linear movement of an object. The magnetic field generation unit is a magnet, for example. The angle to be detected by the magnetic angle sensor is, for example, the angle that the direction of the rotating magnetic field in a reference position forms with respect to a reference direction.

Among known angle sensors is one that includes a detection signal generation unit for generating first and second detection signals 90° different in phase from each other and generates the detected angle value by performing an operation using the first and second detection signals. The detection signal generation unit includes a first detection circuit for outputting the first detection signal, and a second detection circuit for outputting the second detection signal. Each of the first and second detection circuits includes at least one magnetic detection element. The magnetic detection element includes, for example, a spin-valve magnetoresistance (MR) element including a magnetization pinned layer whose magnetization direction is pinned, a free layer whose magnetization direction varies depending on the direction of the rotating magnetic field, and a nonmagnetic layer located between the magnetization pinned layer and the free layer.

For the magnetic angle sensors, ideally, the first and second detection signals each have a waveform of a sinusoidal curve (including a sine waveform and a cosine waveform) when the direction of the rotating magnetic field changes with a constant angular velocity and the angle to be detected varies with a predetermined period. However, there are cases where the waveform of each detection signal is distorted from a sinusoidal curve. In such cases, the first detection signal contains a first ideal component which varies in such a manner as to trace an ideal sinusoidal curve and an error component other than the first ideal component, and the second detection signal contains a second ideal component which varies in such a manner as to trace an ideal sinusoidal curve and an error component other than the second ideal component. A distortion of the waveform of each detection signal may result in some error in the detected angle value. The error occurring in the detected angle value will hereinafter be referred to as angular error. It is required of the angle sensor to reduce the angular error.

JP 2006-090738A discloses a technique for correcting two-phase sinusoidal wave signals that are different in phase from each other and outputted from an encoder for use to detect angles or other parameters. According to the technique, an approximate ellipse that is the most analogous to a Lissajous waveform formed by the two-phase sinusoidal wave signals is obtained by the method of least squares, and an approximate third harmonic curve that is the most analogous to a differential signal resulting from subtracting the approximate ellipse from the Lissajous waveform is obtained by the method of least squares. On the basis of the approximate ellipse and the approximate third harmonic curve, the two-phase sinusoidal wave signals are corrected.

JP 2005-331496A and JP 2006-098068A each disclose a rotational speed detection apparatus including an encoder configured to rotate together with a rotating member, a rotation detection sensor, and a computing unit for calculating the rotational speed of the rotating member on the basis of a detection signal from the rotation detection sensor. In the rotational speed detection apparatus, the computing unit is provided with an adaptive filter to eliminate the effect of fluctuation of the detection signal which causes an error in the calculation of the rotational speed of the rotating member.

Some systems using angle sensors are configured to detect an angle whose variation range is less than 360°.

In the technique disclosed in JP 2006-090738A, a plurality of parameters defining the approximate ellipse and a plurality of parameters defining the approximate third harmonic curve are obtained from data of one period of the Lissajous waveform. Thus, the technique is not applicable to a system that is for use to detect an angle whose variation range is less than 360°.

The error component contained in each detection signal of an angle sensor mainly corresponds to one or more harmonics of the detection signal.

According to the technique disclosed in JP 2005-331496A and JP 2006-098068A, the adaptive filter reduces fluctuation of the detection signal having a longer period than the period of variation of the detection signal. The technique disclosed in JP 2005-331496A and JP 2006-098068A is thus unable to reduce the error component contained in each detection signal of the angle sensor.

SUMMARY OF THE INVENTION

It is an object of the present invention to provide a correction apparatus for an angle sensor and an angle sensor that enable reduction of angular error even in the case where the angle sensor is used in a system for detecting an angle whose variation range is less than 360°.

A correction apparatus for an angle sensor of the present invention is for use in an angle sensor that includes a detection signal generation unit for generating a plurality of detection signals each having a correspondence with an angle to be detected, and an angle detection unit for generating a detected angle value on the basis of the plurality of detection signals, the detected angle value having a correspondence with the angle to be detected.

The correction apparatus of the present invention includes a correction processing unit, an indicator value generation unit, and a correction information determination unit. The correction processing unit performs correction processing on the plurality of detection signals to reduce an error of the detected angle value relative to the case where the correction processing is not performed, details of the correction processing being determined according to correction information. The indicator value generation unit generates an indicator value on the basis of the plurality of detection signals, the indicator value having a correspondence with the error of the detected angle value.

The correction information determination unit generates an estimated indicator value, which is an estimated value of the indicator value, using a function that takes one or more values each having a correspondence with the correction information as one or more variables, and determines the correction information by adaptive signal processing so as to reduce the difference between the indicator value and the estimated indicator value.

In the correction apparatus of the present invention, the function that the correction information determination unit uses to generate the estimated indicator value may be a function that takes the detected angle value as another variable.

In the correction apparatus of the present invention, the plurality of detection signals may be a first detection signal and a second detection signal. When the angle to be detected varies with a predetermined period, the first detection signal contains a first ideal component, and the second detection signal contains a second ideal component. The first ideal component and the second ideal component vary periodically in such a manner as to trace an ideal sinusoidal curve with a phase difference of 90° between the first and second ideal components. In such a case, the indicator value generation unit may generate the indicator value by performing operations including an operation to obtain the square root of the sum of the square of the first detection signal and the square of the second detection signal.

In the correction apparatus of the present invention, the correction processing unit may convert the plurality of detection signals into a first computation signal and a second computation signal that are to be used in angle computation for calculating the detected angle value at the angle detection unit. In such a case, the indicator value generation unit may generate the indicator value by performing operations including an operation to obtain the square root of the sum of the square of the first computation signal and the square of the second computation signal.

In the correction apparatus of the present invention, the adaptive signal processing may use a recursive least square algorithm.

In the correction apparatus of the present invention, the angle to be detected may be an angle that the direction of a magnetic field at a reference position forms with respect to a reference direction.

In the correction apparatus of the present invention, a variation range of the angle to be detected may be less than 360°.

An angle sensor of the present invention includes: a detection signal generation unit for generating a plurality of detection signals each having a correspondence with an angle to be detected; an angle detection unit for generating a detected angle value on the basis of the plurality of detection signals, the detected angle value having a correspondence with the angle to be detected; and the correction apparatus of the present invention.

According to the correction apparatus and the angle sensor of the present invention, the correction information determination unit determines correction information by adaptive signal processing so as to reduce the difference between the indicator value and the estimated indicator value, and the correction processing unit performs correction processing the details of which are determined according to the correction information. The present invention thereby enables reduction of angular error even when the angle sensor is used in a system for detecting an angle whose variation range is less than 360°.

Other and further objects, features and advantages of the present invention will appear more fully from the following description.

DETAILED DESCRIPTION OF THE PREFERRED EMBODIMENTS

First Embodiment

Preferred embodiments of the present invention will now be described in detail with reference to the drawings. First, reference is made to FIG. 1 to describe the general configuration of an angle sensor system including an angle sensor according to a first embodiment of the invention.

Figure 1:
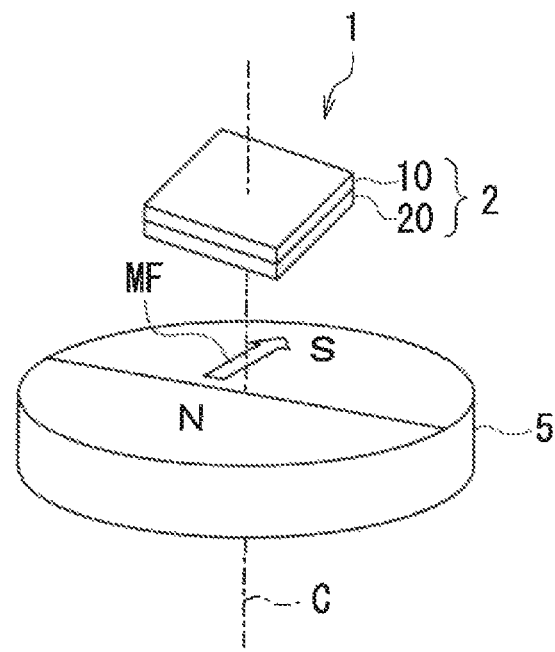
FIG. 1 is a perspective view illustrating the general configuration of an angle sensor system including an angle sensor according to a first embodiment of the invention.

The angle sensor 1 according to the first embodiment is configured to generate a detected angle value θs having a correspondence with an angle θ to be detected. The angle sensor 1 according to the present embodiment is a magnetic angle sensor, in particular. As shown in FIG. 1, the angle sensor 1 according to the present embodiment detects a magnetic field MF whose direction rotates. In this case, the angle θ to be detected is the angle that the direction of the magnetic field MF at a reference position forms with respect to a reference direction. The angle sensor system shown in FIG. 1 includes the angle sensor 1, and a magnet 5 having a cylindrical shape, which is an example of means for generating the magnetic field MF. The magnet 5 has an N pole and an S pole that are arranged symmetrically with respect to an imaginary plane including the central axis of the cylindrical shape. The magnet 5 rotates about the central axis of the cylindrical shape. Consequently, the direction of the magnetic field MF generated by the magnet 5 rotates about a center of rotation C including the central axis of the cylindrical shape.

The reference position is located within an imaginary plane parallel to an end face of the magnet 5. This imaginary plane will hereinafter be referred to as the reference plane. In the reference plane, the direction of the magnetic field MF generated by the magnet 5 rotates about the reference position. The reference direction is located within the reference plane and intersects the reference position. In the following description, the direction of the magnetic field MF at the reference position refers to a direction located within the reference plane. The angle sensor 1 is placed to face the aforementioned end face of the magnet 5.

The angle sensor system of the present embodiment may be configured in other ways than illustrated in FIG. 1. The angle sensor system of the present embodiment need only be configured to vary the relative positional relationship between the angle sensor 1 and the means for generating the magnetic field MF so that the direction of the magnetic field MF at the reference position rotates when viewed from the angle sensor 1. For example, the magnet 5 and the angle sensor 1 arranged as illustrated in FIG. 1 may be configured so that: the angle sensor 1 rotates while the magnet 5 is fixed; the magnet 5 and the angle sensor 1 rotate in mutually opposite directions; or the magnet 5 and the angle sensor 1 rotate in the same direction with mutually different angular velocities.

Alternatively, a magnet that includes one or more pairs of N and S poles arranged alternately in an annular shape may be employed in place of the magnet 5, and the angle sensor 1 may be placed in the vicinity of the outer circumference of the magnet. In such a case, at least one of the magnet and the angle sensor 1 rotates.

Alternatively, a magnetic scale that includes a plurality of pairs of N and S poles arranged alternately in a liner configuration may be employed in place of the magnet 5, and the angle sensor 1 may be placed in the vicinity of the periphery of the magnetic scale. In such a case, at least one of the magnetic scale and the angle sensor 1 moves linearly in the direction in which the N and S poles of the magnetic scale are aligned.

In the above-described various configurations of the angle sensor system, there also exists the reference plane having a predetermined positional relationship with the angle sensor 1, and in the reference plane, the direction of the magnetic field MF rotates about the reference position when viewed from the angle sensor 1.

The angle sensor 1 includes a detection signal generation unit 2 for generating a plurality of detection signals each having a correspondence with the angle θ to be detected. In the present embodiment, the plurality of detection signals are a first detection signal and a second detection signal, in particular. The detection signal generation unit 2 includes a first detection circuit 10 for generating the first detection signal and a second detection circuit 20 for generating the second detection signal. For ease of understanding, FIG. 1 illustrates the first and second detection circuits 10 and 20 as separate components. However, the first and second detection circuits 10 and 20 may be integrated into a single component. Further, while in FIG. 1 the first and second detection circuits 10 and 20 are stacked in a direction parallel to the center of rotation C, the order of stacking may be inversed from that shown in FIG. 1. Each of the first and second detection circuits 10 and 20 includes at least one magnetic detection element for detecting the magnetic field MF.

Figure 2:
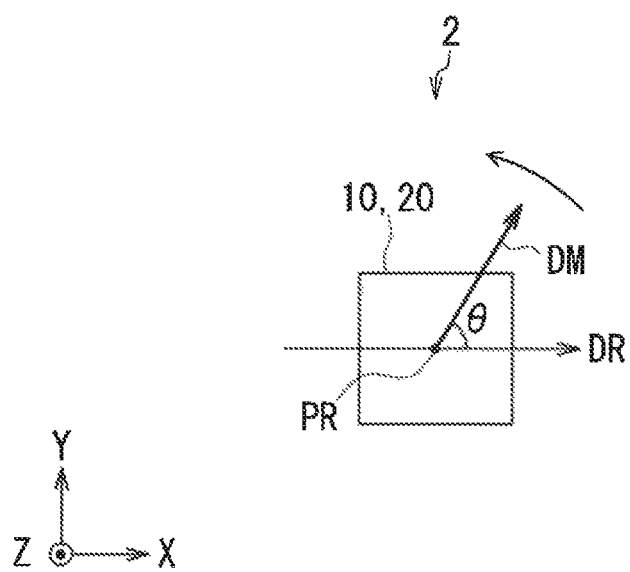
FIG. 2 is an explanatory diagram illustrating the definitions of directions and angles used in the first embodiment of the invention.

Definitions of directions and angles used in the present embodiment will now be described with reference to FIG. 1 and FIG. 2. First, Z direction is the direction parallel to the center of rotation C shown in FIG. 1 and upward in FIG. 1. FIG. 2 illustrates the Z direction as the direction out of the plane of FIG. 2. Next, X and Y directions are two directions that are perpendicular to the Z direction and orthogonal to each other. FIG. 2 illustrates the X direction as the rightward direction, and the Y direction as the upward direction. Further, −X direction is the direction opposite to the X direction, and −Y direction is the direction opposite to the Y direction.

The reference position PR is the position where the angle sensor 1 detects the magnetic field MF. The reference direction DR is the X direction. As mentioned above, the angle θ to be detected is the angle that the direction DM of the magnetic field MF at the reference position PR forms with respect to the reference direction DR. The direction DM of the magnetic field MF rotates counterclockwise in FIG. 2. The angle θ will be expressed in positive values when seen counterclockwise from the reference direction DR, and in negative values when seen clockwise from the reference direction DR.

The variation range of the angle θ may be 360° or more, or less than 360°. In the present embodiment, the variation range of the angle θ is less than 360°, in particular.

Figure 3:
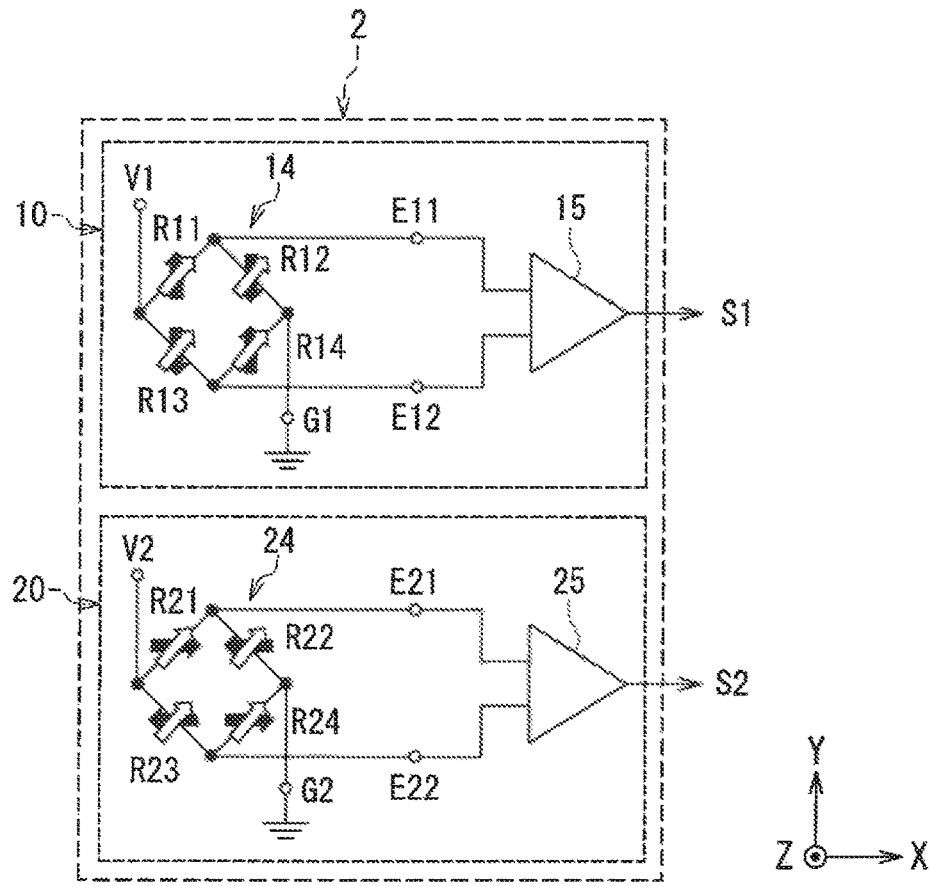
FIG. 3 is a circuit diagram illustrating the configuration of a detection signal generation unit of the angle sensor according to the first embodiment of the invention.

The configuration of the detection signal generation unit 2 will now be described in detail with reference to FIG. 3. FIG. 3 is a circuit diagram illustrating the configuration of the detection signal generation unit 2. As mentioned above, the detection signal generation unit 2 includes the first detection circuit 10 for generating the first detection signal S1 and the second detection circuit 20 for generating the second detection signal S2.

As the direction DM of the magnetic field MF rotates with a predetermined period T, the angle θ to be detected varies with the predetermined period T. In such a case, both of the first and second detection signals S1 and S2 vary periodically with a signal period equal to the predetermined period T. The second detection signal S2 differs from the first detection signal S1 in phase.

The first detection circuit 10 includes a Wheatstone bridge circuit 14 and a difference detector 15. The Wheatstone bridge circuit 14 includes a power supply port V1, a ground port G1, two output ports E11 and E12, a first pair of serially connected magnetic detection elements R11 and R12, and a second pair of serially connected magnetic detection elements R13 and R14. One end of each of the magnetic detection elements R11 and R13 is connected to the power supply port V1. The other end of the magnetic detection element R11 is connected to one end of the magnetic detection element R12 and the output port E11. The other end of the magnetic detection element R13 is connected to one end of the magnetic detection element R14 and the output port E12. The other end of each of the magnetic detection elements R12 and R14 is connected to the ground port G1. A power supply voltage of predetermined magnitude is applied to the power supply port V1. The ground port G1 is grounded. The difference detector 15 outputs a signal corresponding to the potential difference between the output ports E11 and E12 as the first detection signal S1.

The second detection circuit 20 has a circuit configuration similar to that of the first detection circuit 10. More specifically, the second detection circuit 20 includes a Wheatstone bridge circuit 24 and a difference detector 25. The Wheatstone bridge circuit 24 includes a power supply port V2, a ground port G2, two output ports E21 and E22, a first pair of serially connected magnetic detection elements R21 and R22, and a second pair of serially connected magnetic detection elements R23 and R24. One end of each of the magnetic detection elements R21 and R23 is connected to the power supply port V2. The other end of the magnetic detection element R21 is connected to one end of the magnetic detection element R22 and the output port E21. The other end of the magnetic detection element R23 is connected to one end of the magnetic detection element R24 and the output port E22. The other end of each of the magnetic detection elements R22 and R24 is connected to the ground port G2. A power supply voltage of predetermined magnitude is applied to the power supply port V2. The ground port G2 is grounded. The difference detector 25 outputs a signal corresponding to the potential difference between the output ports E21 and E22 as the second detection signal S2.

In the present embodiment, each of the magnetic detection elements R11 to R14 and R21 to R24 includes a plurality of magnetoresistance (MR) elements connected in series. Each of the plurality of MR elements is a spin-valve MR element, for example. The spin-valve MR element includes a magnetization pinned layer whose magnetization direction is pinned, a free layer which is a magnetic layer whose magnetization direction varies depending on the direction DM of the magnetic field MF, and a nonmagnetic layer located between the magnetization pinned layer and the free layer. The spin-valve MR element may be a TMR element or a GMR element. In the TMR element, the nonmagnetic layer is a tunnel barrier layer. In the GMR element, the nonmagnetic layer is a nonmagnetic conductive layer. The spin-valve MR element varies in resistance depending on the angle that the magnetization direction of the free layer forms with respect to the magnetization direction of the magnetization pinned layer, and has a minimum resistance when the foregoing angle is 0° and a maximum resistance when the foregoing angle is 180°. In FIG. 3, the filled arrows indicate the magnetization directions of the magnetization pinned layers of the MR elements, and the hollow arrows indicate the magnetization directions of the free layers of the MR elements.

In the first detection circuit 10, the magnetization pinned layers of the MR elements included in the magnetic detection elements R11 and R14 are magnetized in the Y direction, and the magnetization pinned layers of the MR elements included in the magnetic detection elements R12 and R13 are magnetized in the −Y direction. In this case, the potential difference between the output ports E11 and E12 varies depending on the strength of a component in the Y direction (hereinafter, "Y-directional component") of the magnetic field MF. Thus, the first detection circuit 10 detects the strength of the Y-directional component of the magnetic field MF and generates a signal indicative of the strength as the first detection signal S1. The strength of the Y-directional component of the magnetic field MF has a correspondence with the angle θ to be detected.

In the second detection circuit 20, the magnetization pinned layers of the MR elements included in the magnetic detection elements R21 and R24 are magnetized in the X direction, and the magnetization pinned layers of the MR elements included in the magnetic detection elements R22 and R23 are magnetized in the −X direction. In this case, the potential difference between the output ports E21 and E22 varies depending on the strength of a component in the X direction (hereinafter, "X-directional component") of the magnetic field MF. Thus, the second detection circuit 20 detects the strength of the X-directional component of the magnetic field MF and generates a signal indicative of the strength as the second detection signal S2. The strength of the X-directional component of the magnetic field MF has a correspondence with the angle θ to be detected.

Figure 7:
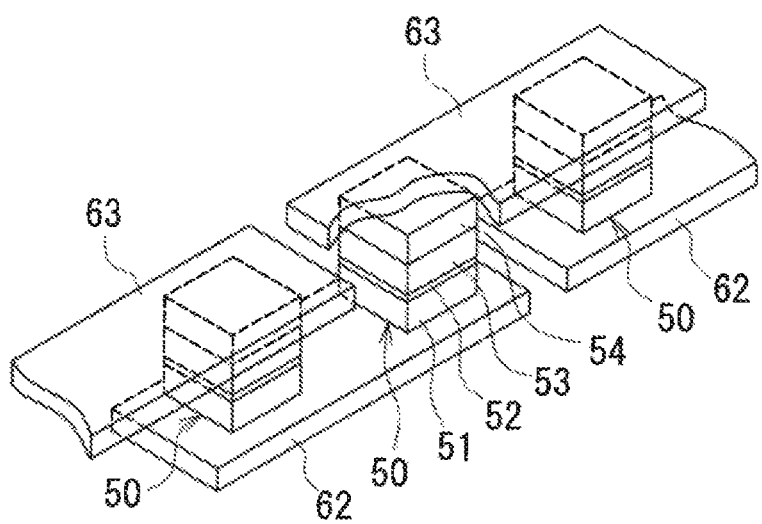
FIG. 7 is a perspective view of a portion of a magnetic detection element shown in FIG. 3.

An example of the configuration of the magnetic detection elements will now be described with reference to FIG. 7. FIG. 7 is a perspective view illustrating a portion of a magnetic detection element in the detection signal generation unit 2 shown in FIG. 3. In this example, the magnetic detection element includes a plurality of lower electrodes 62, a plurality of MR elements 50 and a plurality of upper electrodes 63. The plurality of lower electrodes 62 are arranged on a substrate (not illustrated). Each of the lower electrodes 62 has a long slender shape. Every two lower electrodes 62 that are adjacent to each other in the longitudinal direction of the lower electrodes 62 have a gap therebetween. As shown in FIG. 7, MR elements 50 are provided on the top surfaces of the lower electrodes 62, near opposite ends in the longitudinal direction. Each of the MR elements 50 includes a free layer 51, a nonmagnetic layer 52, a magnetization pinned layer 53, and an antiferromagnetic layer 54 which are stacked in this order, the free layer 51 being closest to the lower electrode 62. The free layer 51 is electrically connected to the lower electrode 62. The antiferromagnetic layer 54 is formed of an antiferromagnetic material. The antiferromagnetic layer 54 is in exchange coupling with the magnetization pinned layer 53 so as to pin the magnetization direction of the magnetization pinned layer 53. The plurality of upper electrodes 63 are arranged over the plurality of MR elements 50. Each of the upper electrodes 63 has a long slender shape, and establishes electrical connection between the respective antiferromagnetic layers 54 of two adjacent MR elements 50 that are arranged on two lower electrodes 62 adjacent in the longitudinal direction of the lower electrodes 62. With such a configuration, the plurality of MR elements 50 in the magnetic detection element shown in FIG. 7 are connected in series by the plurality of lower electrodes 62 and the plurality of upper electrodes 63. It should be appreciated that the layers 51 to 54 of the MR elements 50 may be stacked in an order reverse to that shown in FIG. 7.

As described previously, when the angle θ to be detected varies with the predetermined period T, the first and second detection signals S1 and S2 both vary periodically with a signal period equal to the predetermined period T. When the angle θ to be detected varies with the predetermined period T, each of the first and second detection signals S1 and S2 contains an ideal component and an error component other than the ideal component. The ideal component varies periodically in such a manner as to trace an ideal sinusoidal curve (including a sine waveform and a cosine waveform). Hereinafter, the ideal component of the first detection signal S1 will be referred to as the first ideal component, and the ideal component of the second detection signal S2 will be referred to as the second ideal component. The first and second ideal components are different in phase from each other, and have a predetermined phase relationship with each other. In the present embodiment, the first ideal component and the second ideal components have a phase difference of 90°, in particular.

The first ideal component is represented here as sin θ, and the second ideal component as cos θ. Ideally, the first detection signal S1 should have a sine waveform, and the second detection signal S2 should have a cosine waveform. In actuality, however, depending on the production accuracy of the magnetic detection elements and/or the MR elements or other factors, the detection signals S1 and S1 may each have an offset, may have different amplitudes from each other, or may have a phase difference other than 90°. In such cases, an error of the detected angle value θs will result. The error of the detected angle value θs will hereinafter be referred to as angular error.

Furthermore, each of the detection signals S1 and S2 may contain an error component due to, for example, variations of the magnetization direction of the magnetization pinned layer 53 of the MR element 50 under the influence of the magnetic field MF or with other factors, or a difference of the magnetization direction of the free layer 51 of the MR element 50 from the direction DM of the magnetic field MF under the influence of a magnetic anisotropy of the free layer 51 or with other factors. In such a case also, angular error of the detected angle value θs will result.

A major constituent of the error component of the first detection signal S1 corresponds to the third harmonic of the first ideal component, and will hereinafter be referred to as the first third-harmonic error component S13. A major constituent of the error component of the second detection signal S2 corresponds to the third harmonic of the second ideal component, and will hereinafter be referred to as the second third-harmonic error component S23. When the first ideal component is represented as sin θ and the second ideal component as cos θ as mentioned above, the first and second third-harmonic error components S13 and S23 are expressible by the following Eqs. (1) and (2), respectively. In Eqs. (1) and (2), G is a real number.

$$S13=G\cdot\sin(3\theta-180°)=G(-\sin 3\theta)=G(4\sin^3\theta-3\sin\theta) \quad (1)$$

$$S23=G\cdot\cos 3\theta=G(4\cos^3\theta-3\cos\theta) \quad (2)$$

Figure 4:
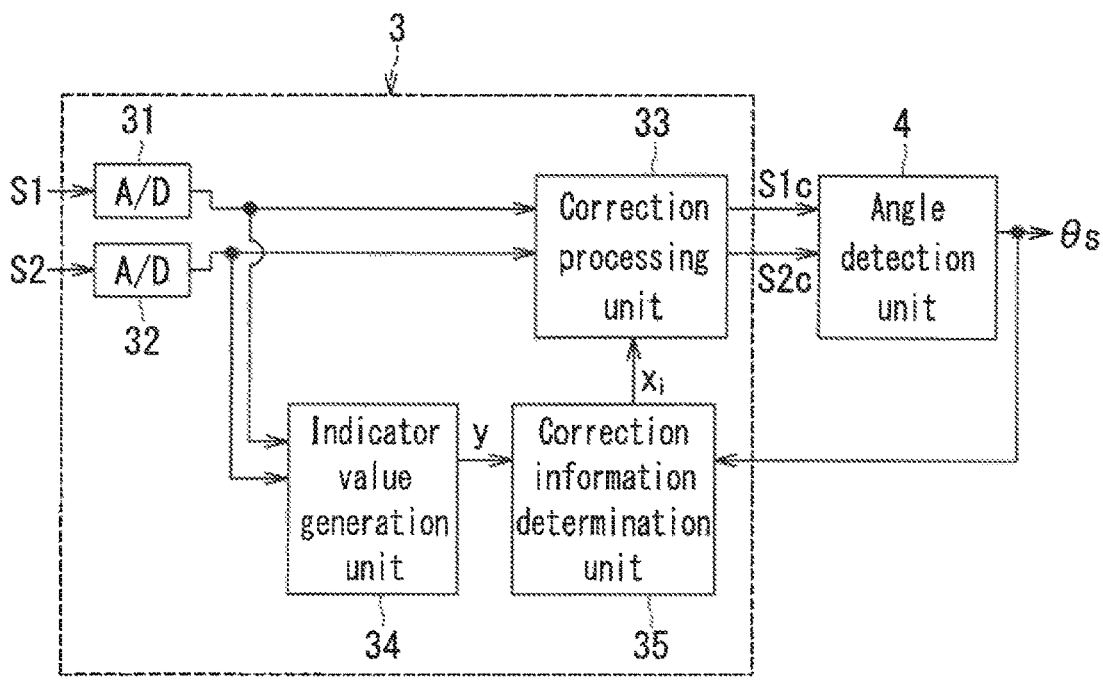
FIG. 4 is a functional block diagram illustrating the configuration of a correction apparatus and an angle detection unit according to the first embodiment of the invention.

Now, components of the angle sensor 1 other than the detection signal generation unit 2 will be described with reference to FIG. 4. The angle sensor 1 includes a correction apparatus 3 according to the present embodiment and an angle detection unit 4, in addition to the detection signal generation unit 2. FIG. 4 is a functional block diagram illustrating the configuration of the correction apparatus 3 and the angle detection unit 4. The correction apparatus 3 and the angle detection unit 4 can be implemented by a digital signal processor (DSP), an application-specific integrated circuit (ASIC) or a microcomputer, for example. On the basis of the plurality of detection signals, the angle detection unit 4 generates a detected angle value θs having a correspondence with the angle θ to be detected.

The correction apparatus 3 includes a correction processing unit 33, an indicator value generation unit 34, and a correction information determination unit 35. The correction processing unit 33 performs correction processing on the plurality of detection signals to reduce the angular error of the detected angle value θs relative to the case where the correction processing is not performed. The details of the correction processing are determined according to correction information. The indicator value generation unit 34 generates, on the basis of the plurality of detection signals, an indicator value y having a correspondence with the angular error of the detected angle value θs. The correction information determination unit 35 determines the correction information and supplies the same to the correction processing unit 33.

In the present embodiment, in particular, the plurality of detection signals are the first detection signal S1 and the second detection signal S2. The correction apparatus 3 further includes analog-to-digital converters (hereinafter, "A/D converters") 31 and 32. The correction apparatus 3 and the angle detection unit 4 use digital signals. The A/D converter 31 converts the first detection signal S1 into a digital signal. The A/D converter 32 converts the second detection signal S2 into a digital signal. The correction processing unit 33 convers the digital signals converted from the first and second detection signals S1 and S2 by the A/D converters 31 and 32 into a first computation signal S1c and a second computation signal S2c which are to be used in angle computation for calculating the detected angle value θs at the angle detection unit 4.

The indicator value generation unit 34 generates the indicator value y by performing operations including an operation to obtain the square root of the sum of the square of the first detection signal S1 and the square of the second detection signal S2. Note that the phrase "operations including an operation to obtain the square root of the sum of the square of the first detection signal S1 and the square of the second detection signal S2" is intended to mean that the operations include multiplying the obtained square root by a predetermined coefficient or adding/subtracting a predetermined value to/from the obtained square root. The same goes for similar phrases herein. In the present embodiment, the indicator value generation unit 34 generates the indicator value y by the following Eq. (3).

$$y=\sqrt{(S1^2+S2^2)} \quad (3)$$

The correction information determination unit 35 generates an estimated indicator value, which is an estimated value of the indicator value y, using a function that takes one or more values each having a correspondence with the correction information as one or more variables. The correction information determination unit 35 also determines the correction information by adaptive signal processing so as to reduce the difference between the indicator value y and the estimated indicator value. The process of determining the correction information by the adaptive signal processing is performed under a condition where the angle θ to be detected varies.

Figure 5:
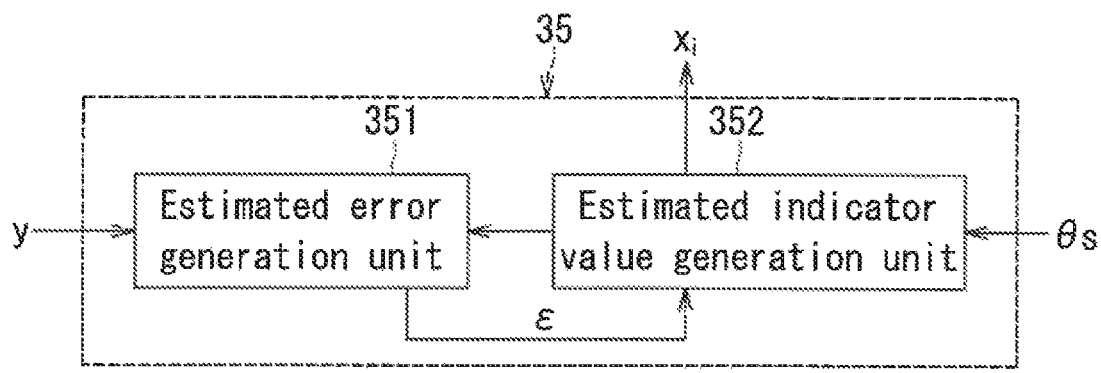
FIG. 5 is a functional block diagram illustrating the configuration of a correction information determination unit of the correction apparatus according to the first embodiment of the invention.

Reference is now made to FIG. 5 to describe the configuration and operation of the correction information determination unit 35 of the present embodiment. FIG. 5 is a functional block diagram illustrating the configuration of the correction information determination unit 35. The correction information determination unit 35 includes an estimated error generation unit 351 and an estimated indicator value generation unit 352. The estimated error generation unit 351 generates the difference between the indicator value y and the estimated indicator value. The difference between the indicator value y and the estimated indicator value will hereinafter be referred to as estimated error ε. The estimated indicator value generation unit 352 generates the estimated indicator value and determines the correction information by the adaptive signal processing so as to reduce the estimated error ε. The estimated indicator value generation unit 352 supplies, at a predetermined time, the correction processing unit 33 with the correction information at that point in time.

In the present embodiment, the correction information is correction values $F_1$, $F_2$, $G_1$, $G_2$, D, and $G_3$. The correction value $F_1$ is a value for correcting the offset of the first detection signal S1. The correction value $F_2$ is a value for correcting the offset of the second detection signal S2. The correction value $G_1$ is a value for correcting the amplitude of the first detection signal S1. The correction value $G_2$ is a value for correcting the amplitude of the second detection signal S2. The correction value D is a value for correcting the phase of the first detection signal S1. The correction value $G_3$ is a value for reducing the first and second third-harmonic error components S13 and S23. A correction method using the correction values $F_1$, $F_2$, $G_1$, $G_2$, D, and $G_3$ will be described later.

Now, we define a correction-related information vector X as follows. The correction-related information vector X contains six components $x_1$, $x_2$, $x_3$, $x_4$, $x_5$, and $x_6$. In the present embodiment, the components $x_1$, $x_2$, $x_3$, $x_4$, $x_5$, and $x_6$ are equal to the correction values $F_1$, $F_2$, $G_1$, $G_2$, D, and $G_3$, respectively. Thus, the six components $x_1$ to $x_6$ each have a correspondence with the correction information. The six components $x_1$ to $x_6$ correspond to the "one or more values each having a correspondence with the correction information", i.e., the one or more variables of the function that the correction information determination unit 35 uses to generate the estimated indicator value. A group of the correction values $F_1$, $F_2$, $G_1$, $G_2$, D, and $G_3$ will hereinafter be referred to as correction information $x_i$. In the present embodiment, the correction information $x_i$ is also a group of the six components $x_1$ to $x_6$. The correction-related information vector X is expressed by the following Eq. (4).

$$X^T = [x_1, x_2, x_3, x_4, x_5, x_6] \quad (4)$$

In the present embodiment, $z^T X$ represents the function that the correction information determination unit 35 uses to generate the estimated indicator value. The function $z^T X$ is a function that takes the six components $x_1$ to $x_6$ as variables. The character "z" represents a vector containing six components $z_1$ to $z_6$ and expressed by the following Eq. (5).

$$z^T = [z_1, z_2, z_3, z_4, z_5, z_6] \quad (5)$$

The components $z_1$ to $z_6$ are expressed by the following Eqs. (6A) to (6F), respectively.

$$z_1 = \sin\theta s \quad (6A)$$

$$z_2 = \cos\theta s \quad (6B)$$

$$z_3 = (1 - \cos 2\theta s)/2 \quad (6C)$$

$$z_4 = (1 + \cos 2\theta s)/2 \quad (6D)$$

$$z_5 = (\sin 2\theta s)/2 \quad (6E)$$

$$z_6 = \cos 4\theta s \quad (6F)$$

Each of the components $z_1$ to $z_6$ is a function that takes the detected angle value θs as a variable. Thus, $z^T X$ is a function that takes the six components $x_1$ to $x_6$ as variables as described above and takes the detected angle value θs as another variable. The estimated indicator value generation unit 352 calculates the components $z_1$ to $z_6$ by Eqs. (6A) to (6F) using the correction information $x_i$ and the detected angle value θs, and calculates the function $z^T X$ to determine the estimated indicator value. A method for generating the detected angle value θs will be described later.

The estimated error generation unit 351 generates the estimated error ε using the indicator value y generated by the indicator value generation unit 34 and the estimated indicator value generated by the estimated indicator value generation unit 352. The estimated error ε is expressed by the following Eq. (7).

$$\varepsilon = y - z^T X \quad (7)$$

Figure 8:
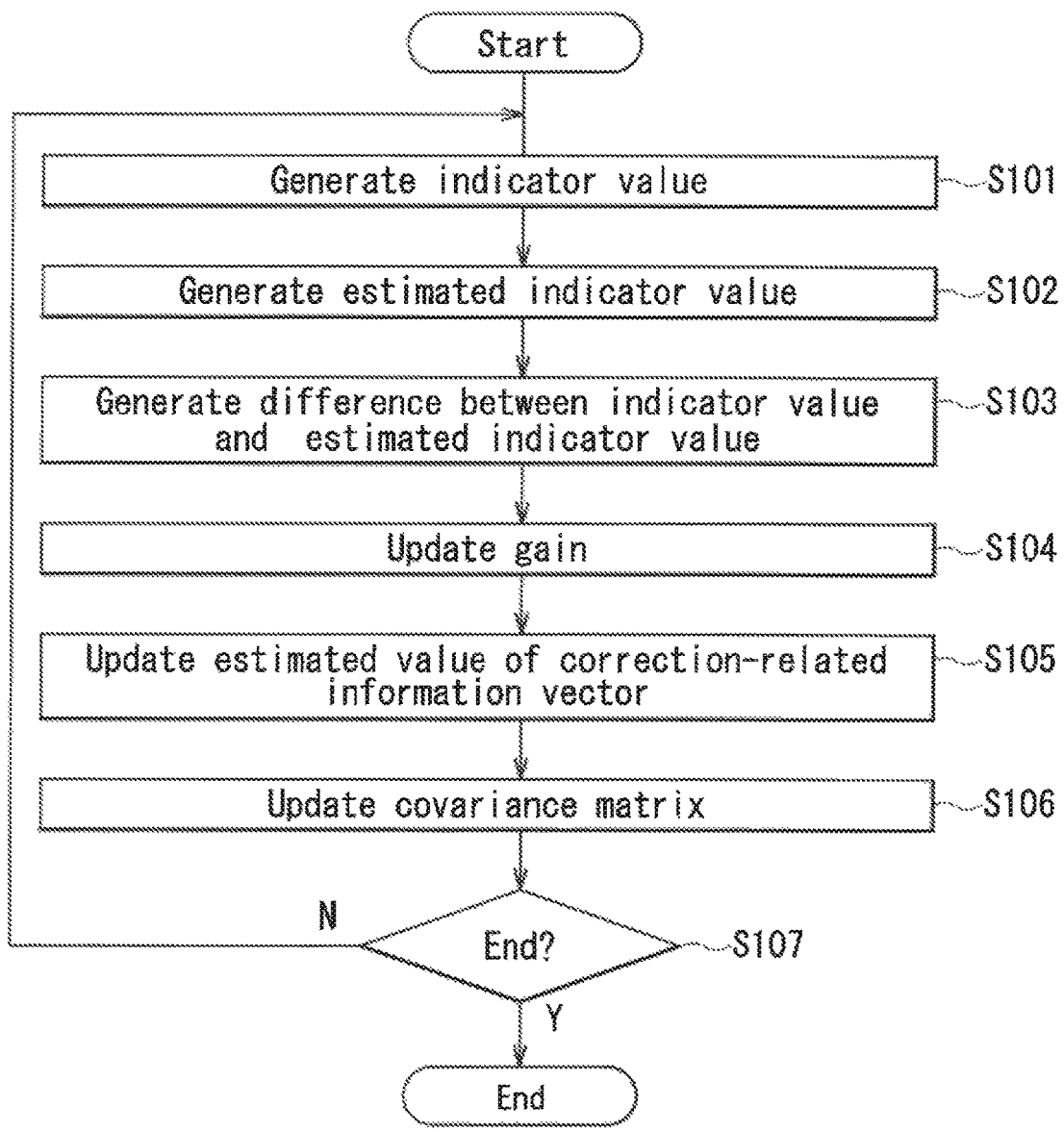
FIG. 8 is a flowchart illustrating adaptive signal processing in the first embodiment of the invention.

In the present embodiment, a recursive least square (RLS) algorithm is used in the adaptive signal processing for reducing the estimated error ε. Reference is now made to FIG. 8 to describe the adaptive signal processing according to the present embodiment in detail. FIG. 8 is a flowchart of the adaptive signal processing according to the present embodiment. In the adaptive signal processing, a series of processing constituted of steps S101 to S106 shown in FIG. 8 is repeatedly performed under the condition where the angle θ to be detected varies.

The series of processing performed at the Nth time (N is an integer greater than or equal to 2) will be described below. First, in step S101, an indicator value y is generated. Step S101 is performed by the indicator value generation unit 34. The indicator value generated at the Nth time will be denoted by symbol $y_N$. The indicator value generation unit 34 generates the indicator value $y_N$ by Eq. (3) presented above, using the first and second detection signals S1 and S2.

Next, in step S102, an estimated indicator value is generated. Step S102 is performed by the estimated indicator value generation unit 352. The estimated indicator value is obtained by calculating a function $z_N^T X_{N-1}$, where $z_N$ represents the vector z generated at the Nth time, and $X_{N-1}$ represents an estimated value of the correction-related information vector X generated at the (N−1)th time (see step S105). The estimated indicator value generation unit 352 calculates the six components $z_1$ to $z_6$ of $z_N$ by Eqs. (6A) to (6F) presented above, using the detected angle value θs generated by the angle detection unit 4. The estimated indicator value generation unit 352 holds $X_{N-1}$. The estimated indicator value generation unit 352 generates the estimated indicator value by calculating the function $z_N^T X_{N-1}$ using $z_N$ and $X_{N-1}$ mentioned above.

Next, in step S103, the estimated error ε is generated. Step S103 is performed by the estimated error generation unit 351. The estimated error ε generated at the Nth time will be denoted by symbol $\varepsilon_N$. The estimated error generation unit 351 generates $\varepsilon_N$ using the indicator value $y_N$ generated by the indicator value generation unit 34 and the estimated indicator value generated by the estimated indicator value generation unit 352. $\varepsilon_N$ is expressed by the following Eq. (8).

$$\varepsilon_N = y_N - z_N^T X_{N-1} \quad (8)$$

Next, in step S104, a gain L to be used in the RLS algorithm is updated as follows. Step S104 is performed by the estimated indicator value generation unit 352. In the present embodiment, the gain L is a vector containing six components. The gain L updated at the Nth time will be denoted by symbol $L_N$. The estimated indicator value generation unit 352 generates $L_N$ by the following Eq. (9) using $z_N$ mentioned above, and holds the same.

$$L_N = P_{N-1} z_N / (\rho + z_N^T P_{N-1} z_N) \quad (9)$$

In Eq. (9), $P_{N-1}$ represents a covariance matrix P used in the RLS algorithm and updated at the (N−1)th time (see step S106). In the present embodiment, the covariance matrix P is a matrix with 6 rows and 6 columns. In Eq. (9), ρ represents a forgetting factor. The forgetting factor ρ is larger than 0 and smaller than or equal to 1. The estimated indicator value generation unit 352 holds $P_{N-1}$ and $\rho$.

Next, in step S105, the estimated value of the correction-related information vector X is updated as follows. Step S105 is performed by the estimated indicator value generation unit 352. Here, $X_N$ represents the estimated value of the correction-related information vector X updated at the Nth time. The estimated indicator value generation unit 352 generates $X_N$ by the following Eq. (10) using $X_{N-1}$ and $L_N$ mentioned above and $\varepsilon_N$ generated by the estimated error generation unit 351, and holds $X_N$ thus generated.

$$X_N = X_{N-1} + L_N \varepsilon_N \quad (10)$$

The estimated indicator value generation unit 352 determines the correction information $x_i$ on the basis of the estimated value $X_N$ of the correction-related information vector X. To be more specific, the six components $x_1$ to $x_6$ of $X_N$ are determined as the correction values $F_1$, $F_2$, $G_1$, $G_2$, D, and $G_3$. The timing of supply of the correction information $x_i$ from the estimated indicator value generation unit 352 to the correction processing unit 33 will be described later.

Next, in step S106, the covariance matrix P is updated as follows. Step S106 is performed by the estimated indicator value generation unit 352. The covariance matrix P updated at the Nth time will be denoted by symbol $P_N$. The estimated indicator value generation unit 352 generates $P_N$ by the following Eq. (11) using $Z_N$, $P_{N-1}$ and $\rho$ mentioned above, and holds $P_N$ thus generated.

$$P_N = \{P_{N-1} - P_{N-1} z_N z_N^T P_{N-1} / (\rho + z_N^T P_{N-1} z_N)\} / \rho \quad (11)$$

Next, in step S107, the correction apparatus 3 determines whether to end the adaptive signal processing or not. If the adaptive signal processing is determined to be ended in step S107 (Y in S107), the adaptive signal processing is ended. The adaptive signal processing is ended by, for example, inputting a signal that commands an end to the correction apparatus 3. If the adaptive signal processing is not determined to be ended in step S107 (N in S107), the operation returns to step S101.

Now, a series of processing to be performed at the first time in the adaptive signal processing will be described. The details of the series of processing to be performed at the first time are basically the same as those to be performed at the Nth time described above. However, the series of processing to be performed at the first time uses an initial value $P_0$ of the covariance matrix P, instead of $P_{N-1}$, in steps S104 and S106. For example, an identity matrix with 6 rows and 6 columns is used as the initial value $P_0$. As the gain L updated at the first time, the estimated indicator value generation unit 352 generates $L_1$ by the above-presented Eq. (9) using the initial value $P_0$. As the covariance matrix P updated at the first time, the estimated indicator value generation unit 352 generates $P_1$ by the above-presented Eq. (11) using the initial value $P_0$.

The series of processing to be performed at the first time uses an initial value $X_0$ of the correction-related information vector X, instead of $X_{N-1}$, in step S105. As the initial value $X_0$, for example, $X_0$ represented by the following Eq. (12) is used.

$$X_0^T = [0,0,1,1,0,0] \quad (12)$$

As the estimated value X updated at the first time, the estimated indicator value generation unit 352 generates $X_1$ by the above-presented Eq. (10) using the initial value $X_0$, and holds $X_1$ thus generated.

Now, a description will be given of the timing of supply of the correction information $x_i$ from the estimated indicator value generation unit 352 to the correction processing unit 33. When the correction apparatus 3 starts its operation, the estimated indicator value generation unit 352 supplies the correction processing unit 33 with an initial value of the correction information $x_i$, as the correction information $x_i$. The initial value of the correction information $x_i$ is, in the concrete, six components of the initial value $X_0$. After that, every time the correction information $x_i$ is updated by the series of processing in the adaptive signal processing, the estimated indicator value generation unit 352 may supply the updated correction information $x_i$ to the correction processing unit 33.

Alternatively, when the number N of times the series of processing in the adaptive signal processing is performed has reached a predetermined number $N_p$, the estimated indicator value generation unit 352 may supply the correction processing unit 33 with the correction information $x_i$ at that point in time. $N_p$ is determined on the basis of the number of times the series of processing is performed at which, for example, it is estimated that each of $x_1$ to $x_6$ converges on its optimal value.

After N reaches $N_p$, the estimated indicator value generation unit 352 may supply the correction processing unit 33 with updated correction information $x_i$ every time the correction information $x_i$ is updated by the series of processing in the adaptive signal processing. Alternatively, the estimated indicator value generation unit 352 may reset N to 0 and set a new $N_p$. When N has reached the new $N_p$, the estimated indicator value generation unit 352 may supply the correction processing unit 33 with the correction information $x_i$ at that point in time.

Figure 6:
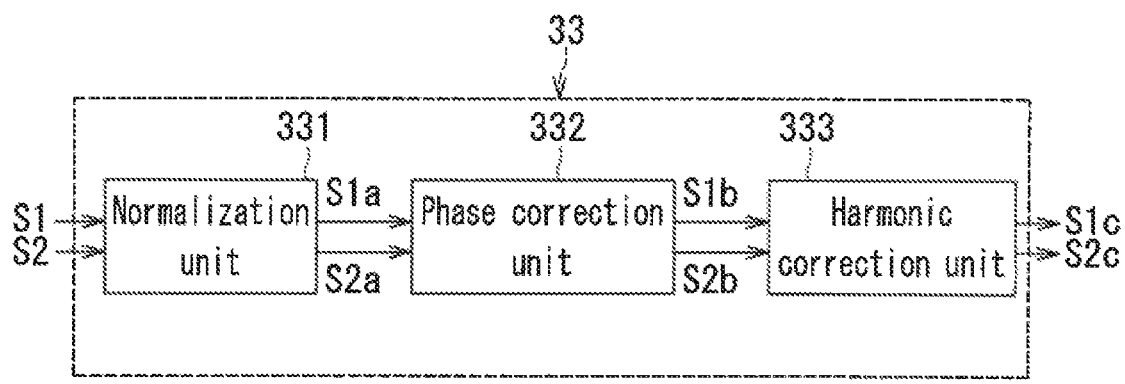
FIG. 6 is a functional block diagram illustrating the configuration of a correction processing unit of the correction apparatus according to the first embodiment of the invention.

The configuration and operation of the correction processing unit 33 will now be described with reference to FIG. 6. FIG. 6 is a functional block diagram illustrating the configuration of the correction processing unit 33. The correction processing unit 33 includes a normalization unit 331, a phase correction unit 332, and a harmonic correction unit 333. Each of the normalization unit 331, the phase correction unit 332 and the harmonic correction unit 333 performs predetermined correction processing using the correction information $x_i$ that is supplied latest from the estimated indicator value generation unit 352 to the correction processing unit 33.

The normalization unit 331 corrects the offset and amplitude of the first detection signal S1 using the correction values $F_1$ and $G_1$. The normalization unit 331 also corrects the offset and amplitude of the second detection signal S2 using the correction values $F_2$ and $G_2$. To be more specific, for example, the normalization unit 331 corrects the first detection signal S1 to generate a signal S1$a$ by the following Eq. (13), and corrects the second detection signal S2 to generate a signal S2$a$ by the following Eq. (14).

$$S1a = (S1 - F_1)/G_1 \quad (13)$$

$$S2a = (S2 - F_2)/G_2 \quad (14)$$

The phase correction unit 332 corrects the phases of the signals S1$a$ and S2$a$ to generate signals S1$b$ and S2$b$ having a phase difference of 90° therebetween. In the present embodiment, the phase difference between the signals S1$b$ and S2$b$ is set at 90° by correcting the phase of the signal S1$a$, which has a correspondence with the first detection signal S1, without correcting the phase of the signal S2$a$, which has a correspondence with the second detection signal S2. The phase of the signal S1$a$ is corrected using the correction value D. To be more specific, for example, the phase correction unit 332 corrects the phase of the signal S1a to generate a signal S1b by the following Eq. (15). The phase correction unit 332 equalizes the signal S2a with the signal S2b as shown in the following Eq. (16).

$$S1b=S1a-(D\cdot2\pi/360)\cdot S2a \quad (15)$$

$$S2b=S2a \quad (16)$$

The harmonic correction unit 333 uses the correction value $G_3$ to reduce the first and second third-harmonic error components S13 and S23 contained in the signals S1b and S2b. To be more specific, for example, the harmonic correction unit 333 first generates an estimated value S13c of the first third-harmonic error component S13 by the following Eq. (17), and generates an estimated value S23c of the second third-harmonic error component S23 by the following Eq. (18).

$$S13c=(4\cdot S1b^3-3\cdot S1b)\cdot G_3 \quad (17)$$

$$S23c=(4\cdot S2b^3-3\cdot S2b)\cdot G_3 \quad (18)$$

Eqs. (17) and (18) are derived from Eqs. (1) and (2), respectively.

The harmonic correction unit 333 then generates the first computation signal S1c by subtracting the estimated value S13c from the signal S1b, and generates the second computation signal S2c by subtracting the estimated value S23c from the signal S2b. To be more specific, the harmonic correction unit 333 generates the first and second computation signals S1c and S2c by the following Eqs. (19) and (20), respectively.

$$S1c=S1b-S13c \quad (19)$$

$$S2c=S2b-S23c \quad (20)$$

A method of generating the detected angle value $\theta s$ will now be described. The angle detection unit 4 calculates the detected angle value $\theta s$ on the basis of the first and second computation signals S1c and S2c resulting from the conversion by the correction processing unit 33. Specifically, for example, the angle detection unit 4 calculates $\theta s$ by the following Eq. (21).

$$\theta s=a\tan(S1c/S2c) \quad (21)$$

For $\theta s$ within the range of 0° to less than 360°, Eq. (21) yields two solutions that are 180° different in value. Which of the two solutions for $\theta s$ in Eq. (21) is the true value of $\theta s$ can be determined from the combination of positive and negative signs of S1c and S2c. The angle computing unit 4 obtains $\theta s$ within the range of 0° to less than 360° using Eq. (21) and on the basis of the foregoing determination on the combination of positive and negative signs of S1c and S2c.

The effect of the correction apparatus 3 according to the present embodiment will now be described. In the present embodiment, the correction information determination unit 35 determines the correction information $x_i$ by the adaptive signal processing so as to reduce the estimated error $\varepsilon$, and the correction processing unit 33 performs the correction processing the details of which are determined according to the correction information $x_i$. In the present embodiment, even when the data range of the indicator value y is narrower than the data range of the first and second detection signals S1 and S2 of one period, the correction information $x_i$ can be determined by the adaptive signal processing. Thus, according to the present embodiment, even when the angle sensor 1 is used in a system for detecting an angle whose variation range is less than 360°, it is possible to reduce the angular error by determining the correction information $x_i$ by the adaptive signal processing.

In the present embodiment, when the correction information $x_i$ is determined using the adaptive signal processing, it is not required to hold data corresponding to the data of the first and second detection signals S1 and S2 of one period. The present embodiment thus enables efficient determination of the correction information $x_i$.

There can be a plurality of factors responsible for distortion of each of the first and second detection signals S1 and S2 from its ideal sinusoidal curve. The distortion of each of the first and second detection signals S and S2 from its ideal sinusoidal curve causes an angular error in the detected angle value $\theta s$. In the present embodiment, the correction information $x_i$ is a plurality of correction values $F_1$, $F_2$, $G_1$, $G_2$, D, and $G_3$. These plurality of correction values are intended to correct the distortion of the detection signals S1 and S2 resulting from the plurality of factors. According to the present embodiment, performing the adaptive signal processing causes each of the plurality of correction values to converge on its optimal value. The present embodiment thus enables reduction of the angular error even when there are a plurality of factors responsible for the distortion of the detection signals S1 and S2.

The angular error can vary depending on, for example, temperature during the use of the angle sensor 1. In the present embodiment, the correction information $x_i$ can be determined by the adaptive signal processing even during the use of the angle sensor 1. The present embodiment thus enables reducing the angular error by determining the correction information $x_i$ by appropriately performing the adaptive signal processing even in an environment in which the angular error can vary depending on, for example, temperature.

The effect of the present embodiment will be described in more detail below with reference to the results of a simulation verifying the operation of the correction apparatus 3 and the angle detection unit 4 according to the present embodiment. In the simulation, respective target values were set for the correction values $F_1$, $F_2$, $G_1$, $G_2$, D and $G_3$, and the first and second detection signals S1 and S2 were generated using a function that was determined using those target values and took the angle $\theta$ to be detected as a variable. A detected angle value calculated on the basis of the first and second detection signals S1 and S2 is herein referred to as initial detected angle value, and represented by symbol $\theta p$. In the simulation, the foregoing target values were set to generate the first and second detection signals S1 and S2 so as to satisfy a condition that, when the initial detected angle value $\theta p$ had an angular error and the correction values $F_1$, $F_2$, $G_1$, $G_2$, D, and $G_3$ met their respective target values, the detected angle value $\theta s$ calculated on the basis of the first and second computation signals S1c and S2c had no angular error. To be more specific, the target values of the correction values $F_1$, $F_2$, D and $G_3$ were set at values other than 0, and the target values of the correction values $G_1$ and $G_2$ were set at values other than 1. The first and second detection signals S1 and S2 were generated using those target values. The simulation verified whether the correction values $F_1$, $F_2$, $G_1$, $G_2$, D, and $G_3$ converged on their respective target values by determining the correction information $x_i$ using the adaptive signal processing shown in FIG. 8.

The initial detected angle value $\theta p$ is calculated by substituting $\theta s$, S1c, and S2c in Eq. (21) with $\theta p$, S1, and S2, respectively. The angular error of the initial detected angle value θp corresponds to the angular error occurring in the detected angle value θs when no correction processing is performed.

The details of the simulation will be concretely described below. In the simulation, the following predetermined operation was performed in a repeated manner. The number of times the predetermined operation was performed will be denoted by symbol n. As the value n varies, the angle θ to be detected varies in accordance with a certain rule, and the first and second detection signals S1 and S2 also vary accordingly. When n is in a range between 1 and 399 inclusive, the details of the predetermined operation are as follows. First, the correction processing described with reference to FIG. 6 was performed using the initial value of the correction information $x_i$ to convert the first and second detection signals S1 and S2 into the first and second computation signals S1c and S2c, respectively. In the simulation, the initial value of each of the correction values $F_1$, $F_2$, D, and $G_3$ was set at 0, and the initial value of each of the correction values $G_1$ and $G_2$ was set at 1. Next, the detected angle value θs was calculated by Eq. (21) using the first and second computation signals S1c and S2c. Then, the angular error was calculated by obtaining the difference between the detected angle value θs and the angle θ to be detected.

When n is in a range between 400 and 2000 inclusive, the details of the predetermined operation are as follows. First, the series of processing constituted of steps S101 to S106 of FIG. 8 was performed to determine the correction information $x_i$. Next, the correction processing described with reference to FIG. 6 was performed using the correction information $x_i$ to convert the first and second detection signals S1 and S2 into the first and second computation signals S1c and S2c, respectively. Next, the detected angle value θs was calculated by Eq. (21) using the first and second computation signals S1c and S2c. Then, the angular error was calculated by obtaining the difference between the detected angle value θs and the angle θ to be detected.

Figure 9:
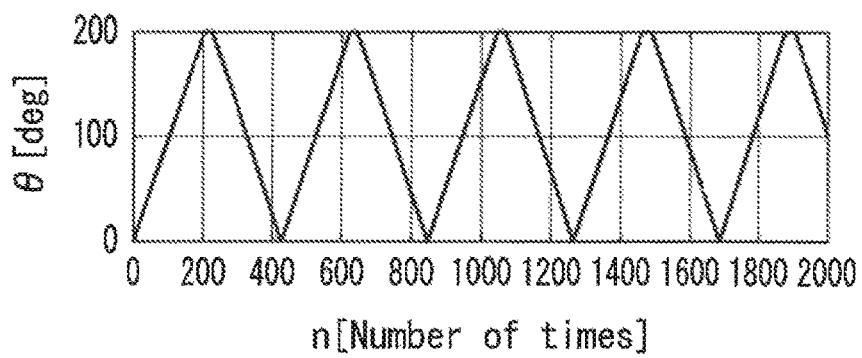
FIG. 9 is a waveform diagram illustrating an angle to be detected that was varied in simulation.

FIG. 9 shows the angle θ to be detected that was varied in the simulation. In FIG. 9, the horizontal axis represents the foregoing "n", and the vertical axis represents the angle θ to be detected. As shown in FIG. 9, in the simulation, the angle θ to be detected was varied to repeatedly increase and decrease in a range between 0° and 200° inclusive.

Figure 10:
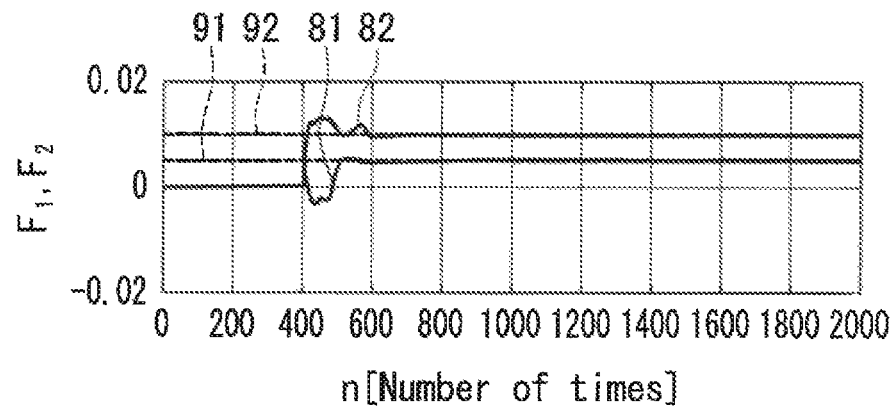
FIG. 10 is a waveform diagram illustrating correction values $F_1$ and $F_2$ obtained by simulation.

FIG. 10 shows the correction values $F_1$ and $F_2$ obtained by simulation. In FIG. 10, the horizontal axis represents the foregoing "n", and the vertical axis represents the correction values $F_1$ and $F_2$. In FIG. 10 the curved line 81 represents the correction value $F_1$, and the curved line 82 represents the correction value $F_2$. The broken straight line 91 represents the target value of the correction value $F_1$, and the broken straight line 92 represents the target value of the correction value $F_2$.

In FIG. 10, when n is in the range between 1 and 399 inclusive, the correction values $F_1$ and $F_2$ represent values in the case of not performing the processing to determine the correction information $x_i$ by the adaptive signal processing, in other words, represent the initial values of the correction values $F_1$ and $F_2$. When n is in the range between 400 and 2000 inclusive, the correction values $F_1$ and $F_2$ represent values in the case of performing the processing to determine the correction information $x_i$ by the adaptive signal processing. As shown in FIG. 10, by performing the aforementioned processing, the correction value $F_1$ converges on its target value, and the correction value $F_2$ converges on its target value. When n is 600 or more, the correction value $F_1$ substantially coincides with its target value, and the correction value $F_2$ substantially coincides with its target value.

Figure 11:
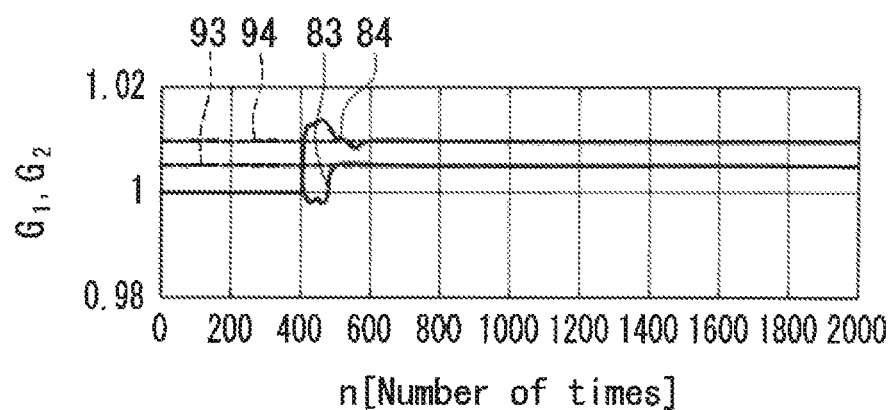
FIG. 11 is a waveform diagram illustrating correction values $G_1$ and $G_2$ obtained by simulation.

FIG. 11 shows the correction values $G_1$ and $G_2$ obtained by simulation. In FIG. 11, the horizontal axis represents the foregoing "n", and the vertical axis represents the correction values $G_1$ and $G_2$. In FIG. 11 the curved line 83 represents the correction value $G_1$, and the curved line 84 represents the correction value $G_2$. The broken straight line 93 represents the target value of the correction value $G_1$, and the broken straight line 94 represents the target value of the correction value $G_2$.

In FIG. 11, when n is in the range between 1 and 399 inclusive, the correction values $G_1$ and $G_2$ represent values in the case of not performing the processing to determine the correction information $x_i$ by the adaptive signal processing, in other words, represent the initial values of the correction values $G_1$ and $G_2$. When n is in the range between 400 and 2000 inclusive, the correction values $G_1$ and $G_2$ represent values in the case of performing the processing to determine the correction information $x_i$ by the adaptive signal processing. As shown in FIG. 11, by performing the aforementioned processing, the correction value $G_1$ converges on its target value, and the correction value $G_2$ converges on its target value. When n is 600 or more, the correction value $G_1$ substantially coincides with its target value, and the correction value $G_2$ substantially coincides with its target value.

Figure 12:
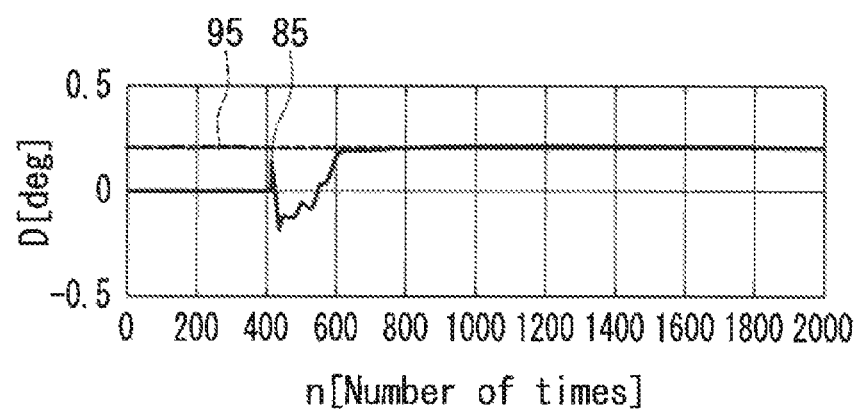
FIG. 12 is a waveform diagram illustrating a correction value D obtained by simulation.

FIG. 12 shows the correction value D obtained by simulation. In FIG. 12, the horizontal axis represents the foregoing "n", and the vertical axis represents the correction value D. In FIG. 12 the curved line 85 represents the correction value D, and the broken straight line 95 represents the target value of the correction value D.

In FIG. 12, when n is in the range between 1 and 399 inclusive, the correction value D represents a value in the case of not performing the processing to determine the correction information $x_i$ by the adaptive signal processing, in other words, represents the initial value of the correction value D. When n is in the range between 400 and 2000 inclusive, the correction value D represents a value in the case of performing the processing to determine the correction information $x_i$ by the adaptive signal processing. As shown in FIG. 12, by performing the aforementioned processing, the correction value D converges on its target value. When n is 600 or more, the correction value D substantially coincides with its target value.

Figure 13:
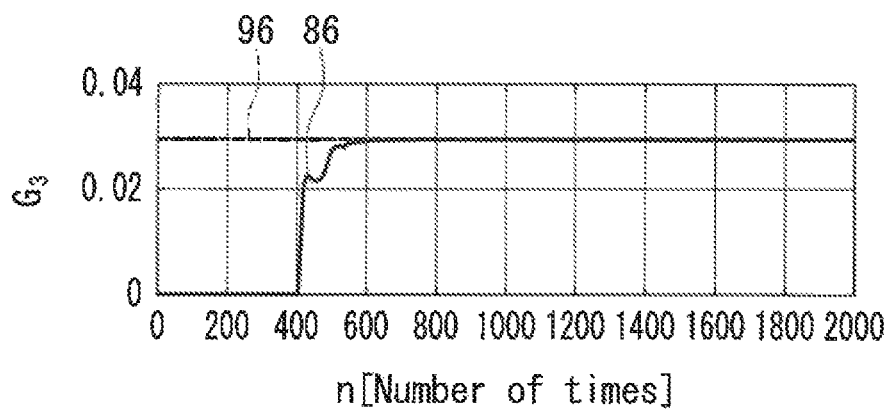
FIG. 13 is a waveform diagram illustrating a correction value $G_3$ obtained by simulation.

FIG. 13 shows the correction value $G_3$ obtained by simulation. In FIG. 13, the horizontal axis represents the foregoing "n", and the vertical axis represents the correction value $G_3$. In FIG. 13 the curved line 86 represents the correction value $G_3$, and the broken straight line 96 represents the target value of the correction value $G_3$.

In FIG. 13, when n is in the range between 1 and 399 inclusive, the correction value $G_3$ represents a value in the case of not performing the processing to determine the correction information $x_i$ by the adaptive signal processing, in other words, represents the initial value of the correction value $G_3$. When n is in the range between 400 and 2000 inclusive, the correction value $G_3$ represents a value in the case of performing the processing to determine the correction information $x_i$ by the adaptive signal processing. As shown in FIG. 13, by performing the aforementioned processing, the correction value $G_3$ converges on its target value. When n is 600 or more, the correction value $G_3$ substantially coincides with its target value.

Figure 14:
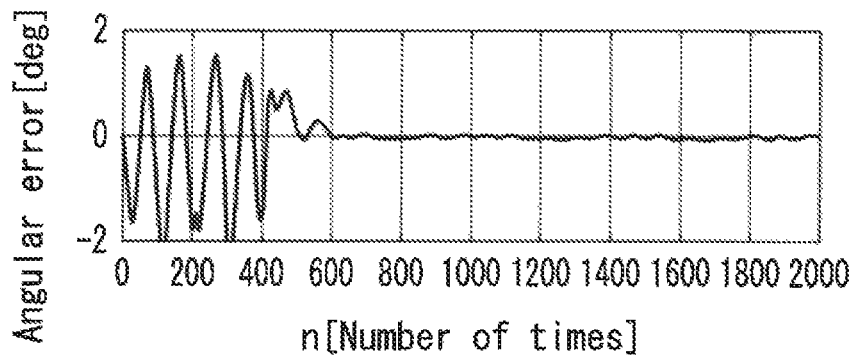
FIG. 14 is a waveform diagram illustrating an angular error obtained by simulation.

FIG. 14 shows the angular error obtained by simulation. In FIG. 14, the horizontal axis represents the foregoing "n", and the vertical axis represents the angular error. In FIG. 14, when n is in the range between 1 and 399 inclusive, the angular error represents a value in the case of not performing the processing to determine the correction information $x_i$ by the adaptive signal processing. When n is in the range between 400 and 2000 inclusive, the angular error represents a value in the case of performing the processing to determine the correction information $x_i$ by the adaptive signal processing. As shown in FIG. 14, by performing the aforementioned processing, the angular error converges on 0. When n is 600 or more, the angular error is substantially 0.

It is apparent from the simulation results that performing the processing to determine the correction information $x_i$ using the adaptive signal processing enables the correction values $F_1$, $F_2$, $G_1$, $G_2$, D, and $G_3$ to converge on their respective target values even if the variation range of the angle θ to be detected is less than 360°, thus allowing a reduction in the angular error.

Second Embodiment

Figure 15:
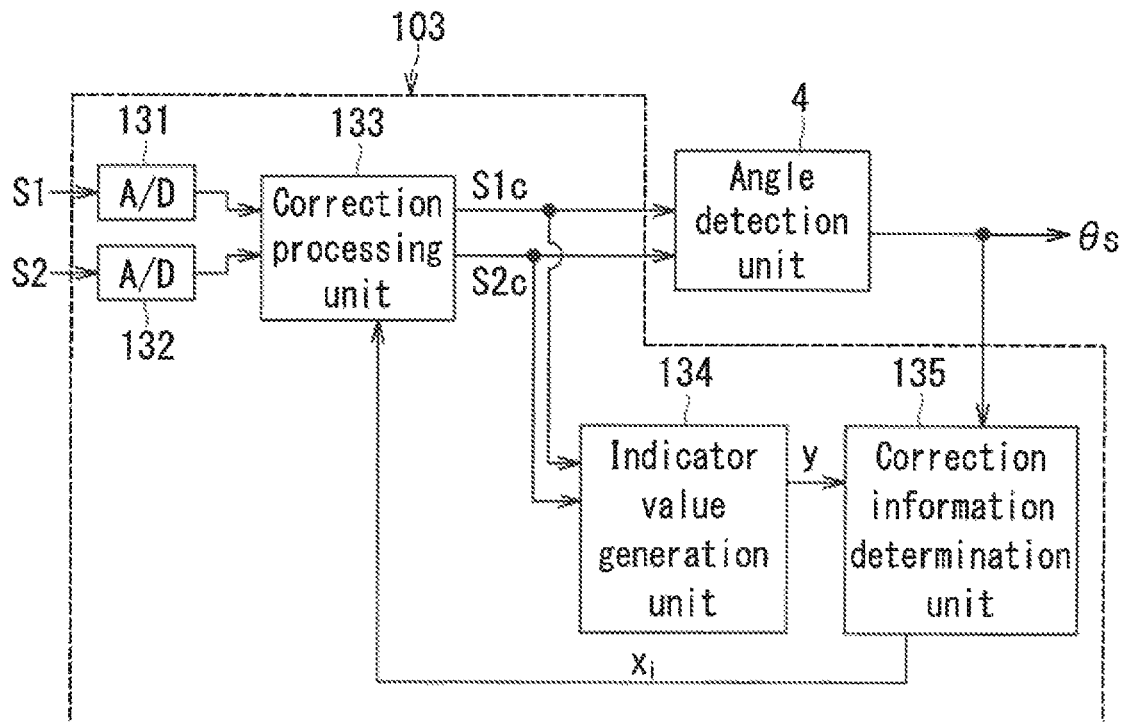
FIG. 15 is a functional block diagram illustrating the configuration of a correction apparatus and an angle detection unit according to a second embodiment of the invention.

A second embodiment of the invention will now be described. First, the configuration of the correction apparatus according to the second embodiment will be described with reference to FIG. 15. The angle sensor 1 according to the second embodiment includes a correction apparatus 103 according to the second embodiment, in place of the correction apparatus 3 according to the first embodiment. FIG. 15 is a functional block diagram illustrating the configuration of the correction apparatus 103 and the angle detection unit 4. The correction apparatus 103 according to the second embodiment includes A/D converters 131 and 132, a correction processing unit 133, an indicator value generation unit 134, and a correction information determination unit 135.

The A/D converter 131 converts the first detection signal S1 into a digital signal. The A/D converter 132 converts the second detection signal S2 into a digital signal. The correction processing unit 133 convers the digital signals converted from the first and second detection signals S1 and S2 by the A/D converters 131 and 132 into a first computation signal S1c and a second computation signal S2c which are to be used in angle computation for calculating the detected angle value θs at the angle detection unit 4. The correction processing unit 133 is configured and operates in the same manner as the correction processing unit 33 of the first embodiment.

The indicator value generation unit 134 generates an indicator value y by performing operations including an operation to obtain the square root of the sum of the square of the first computation signal S1c and the square of the second computation signal S2c. In the present embodiment, the indicator value generation unit 134 generates the indicator value y by the following Eq. (22).

$$y = \sqrt{(s1c^2 + s2c^2)} \quad (22)$$

The correction information determination unit 135 generates an estimated indicator value, which is an estimated value of the indicator value y, using a function that takes one or more values each having a correspondence with the correction information as one or more variables. The correction information determination unit 135 also determines the correction information by adaptive signal processing so as to reduce the difference between the indicator value y and the estimated indicator value, and supplies the correction information to the correction processing unit 133. The process of determining the correction information by the adaptive signal processing is performed under the condition where the angle θ to be detected varies.

The configuration and operation of the correction information determination unit 135 will now be described in detail. The configuration of the correction information determination unit 135 is the same as that of the correction information determination unit 35 of the first embodiment shown in FIG. 5. To be more specific, the correction information determination unit 135 includes an estimated error generation unit 351 and an estimated indicator value generation unit 352. The estimated error generation unit 351 generates an estimated error ε, which is the difference between the indicator value y and the estimated indicator value. The estimated indicator value generation unit 352 generates the estimated indicator value and determines the correction information by the adaptive signal processing so as to reduce the estimated error ε. The estimated indicator value generation unit 352 supplies, at a predetermined time, the correction processing unit 133 with the correction information at that point in time. As in the first embodiment, the correction information in the present embodiment is the correction values $F_1$, $F_2$, $G_1$, $G_2$, D, and $G_3$. As in the first embodiment, a group of the correction values $F_1$, $F_2$, $G_1$, $G_2$, D, and $G_3$ will be referred to as correction information $x_i$.

We define a correction-related information vector X in the present embodiment as follows. The correction-related information vector X contains six components $x_1$, $x_2$, $x_3$, $x_4$, $x_5$, and $x_6$, as represented by Eq. (4) of the first embodiment. In the present embodiment, the components $x_1$, $x_2$, $x_3$, $x_4$, $x_5$, and $x_6$ are equal to update parameters $\Delta F_1$, $\Delta F_2$, $\Delta G_1$, $\Delta G_2$, $\Delta D$, and $\Delta G_3$ for updating the correction values $F_1$, $F_2$, $G_1$, $G_2$, D, and $G_3$, respectively. Thus, the six components $x_1$ to $x_6$ each have a correspondence with the correction information. The six components $x_1$ to $x_6$ correspond to the "one or more values each having a correspondence with the correction information", i.e., the one or more variables of the function that the correction information determination unit 135 uses to generate the estimated indicator value.

In the present embodiment, $z^T X$ represents the function that the correction information determination unit 135 uses to generate the estimated indicator value, as in the first embodiment. As shown in Eq. (5) of the first embodiment, z represents a vector containing six components $z_1$ to $z_6$. The six components $z_1$ to $z_6$ are respectively expressed by Eqs. (6A) to (6F) of the first embodiment. The function $z^T X$ is a function that takes the six components $x_1$ to $x_6$ as variables and takes the detected angle value θs as another variable.

The estimated indicator value generation unit 352 calculates the function $z^T X$ using the six components $x_1$ to $x_6$, i.e. the update parameters $\Delta F_1$, $\Delta F_2$, $\Delta G_1$, $\Delta G_2$, $\Delta D$ and $\Delta G_3$ and the detected angle value θs, and thereby obtains the estimated indicator value. The detected angle value θs is generated by the same method as in the first embodiment.

The estimated error generation unit 351 uses the indicator value y generated by the indicator value generation unit 134 and the estimated indicator value generated by the estimated indicator value generation unit 352 to generate the estimated error ε expressed by Eq. (7) of the first embodiment.

The details of the adaptive signal processing to reduce the estimated error ε are basically the same as those of the first embodiment described with reference to FIG. 8. In the adaptive signal processing, the series of processing constituted of steps S101 to S106 of FIG. 8 is performed in a repeated manner under the condition where the angle θ to be detected varies. In the following description, "N" represents the number of times the series of processing is performed.

In the present embodiment, step S101 is performed by the indicator value generation unit 134. The indicator value generation unit 134 generates the indicator value $y_N$ by Eq.

(22) presented above, using the first and second computation signals S1c and S2c resulting from the correction processing by the correction processing unit 133.

As has been described in relation to the first embodiment, in step S105, the estimated value $X_N$ of the correction-related information vector X is updated. In the present embodiment, the estimated indicator value generation unit 352 determines the update parameters $\Delta F_1$, $\Delta F_2$, $\Delta G_1$, $\Delta G_2$, $\Delta D$, and $\Delta G_3$ on the basis of the estimated value $X_N$. In the present embodiment, the six components $x_1$ to $x_6$ of $X_N$ serve as the update parameters $\Delta F_1$, $\Delta F_2$, $\Delta G_1$, $\Delta G_2$, $\Delta D$, and $\Delta G_3$. The estimated indicator value generation unit 352 determines the correction information $x_i$, i.e. the correction values $F_1$, $F_2$, $G_1$, $G_2$, $D$, and $G_3$, on the basis of the update parameters $\Delta F_1$, $\Delta F_2$, $\Delta G_1$, $\Delta G_2$, $\Delta D$, and $\Delta G_3$.

The correction values $F_1$, $F_2$, $G_1$, $G_2$, $D$, and $G_3$ are updated every time the estimated value $X_N$ is updated, for example. In this case, the estimated indicator value generation unit 352 calculates the correction values $F_1$, $F_2$, $G_1$, $G_2$, $D$, and $G_3$ by the following Eqs. (23A) to (23F).

$$F_{1(N)} = F_{1(N-1)} + \Delta F_1 \quad (23A)$$

$$F_{2(N)} = F_{2(N-1)} + \Delta F_2 \quad (23B)$$

$$G_{1(N)} = G_{1(N-1)} \cdot \Delta G_1 \quad (23C)$$

$$G_{2(N)} = G_{2(N-1)} \cdot \Delta G_2 \quad (23D)$$

$$D_{(N)} = D_{(N-1)} + \Delta D \quad (23E)$$

$$G_{3(N)} = G_{3(N-1)} + \Delta G_3 \quad (23F)$$

In Eqs. (23A) to (23F), $F_{1(N)}$, $F_{2(N)}$, $G_{1(N)}$, $G_{2(N)}$, $D_{(N)}$, and $G_{3(N)}$ represent the correction values $F_1$, $F_2$, $G_1$, $G_2$, $D$, and $G_3$ updated at the Nth time, respectively. $F_{1(N-1)}$, $F_{2(N-1)}$, $G_{1(N-1)}$, $G_{2(N-1)}$, $D_{(N-1)}$, and $G_{3(N-1)}$ represent the correction values $F_1$, $F_2$, $G_1$, $G_2$, $D$, and $G_3$ updated at the (N−1)th time, respectively. The estimated indicator value generation unit 352 holds the updated correction values $F_1$, $F_2$, $G_1$, $G_2$, $D$, and $G_3$. In the first update, initial values of the correction values $F_1$, $F_2$, $G_1$, $G_2$, $D$, and $G_3$ are used instead of $F_{1(N-1)}$, $F_{2(N-1)}$, $G_{1(N-1)}$, $G_{2(N-1)}$, $D_{(N-1)}$, and $G_{3(N-1)}$ of Eqs. (23A) to (23F). To be more specific, the initial value of each of the correction values $F_1$, $F_2$, $D$, and $G_3$ is 0, and the initial value of each of the correction values $G_1$ and $G_2$ is 1.

The timing of supply of the correction information $x_i$ from the estimated indicator value generation unit 352 to the correction processing unit 133 is the same as the timing of supply of the correction information $x_i$ from the estimated indicator value generation unit 352 to the correction processing unit 33 described in relation to the first embodiment.

Now, a brief description will be given of the results of first and second simulations verifying the operation of the correction apparatus 103 and the angle detection unit 4 according to the present embodiment. The details of the first simulation are the same as those of the simulation described in relation to the first embodiment. In the first simulation, respective target values were set for the correction values $F_1$, $F_2$, $G_1$, $G_2$, $D$ and $G_3$, and the correction information $x_i$ was determined using the adaptive signal processing of the present embodiment to check whether or not the correction values $F_1$, $F_2$, $G_1$, $G_2$, $D$, and $G_3$ converged on their respective target values. It was verified that the correction values $F_1$, $F_2$, $G_1$, $G_2$, $D$, and $G_3$ converged on their respective target values in the present embodiment. Further, in the first simulation, an angular error of the detected angle value θs was calculated. It was also verified that the angular error converged on 0 in the present embodiment.

Assuming that the computation signals S1c and S2c, instead of the detection signals S1 and S2, are inputted to a virtual correction processing unit having the same configuration as the correction processing unit 33 of the first embodiment, the update parameters $\Delta F_1$, $\Delta F_2$, $\Delta G_1$, $\Delta G_2$, $\Delta D$ and $\Delta G_3$ obtained in the present embodiment can be said to be correction information used to determine the details of virtual correction processing to be performed by the virtual correction processing unit. In the second simulation, detected angle values θs were compared between the case of generating new two computation signals by such virtual correction processing and the case of generating the computation signals S1c and S2c by the correction processing by the correction processing unit 133 using the correction values $F_1$, $F_2$, $G_1$, $G_2$, $D$ and $G_3$ updated using the update parameters $\Delta F_1$, $\Delta F_2$, $\Delta G_1$, $\Delta G_2$, $\Delta D$ and $\Delta G_3$ as in the present embodiment. As a result, there was hardly any difference in the detected angle value θs between the two cases. It was thus verified that the correction processing by the correction processing unit 133 according to the present embodiment was appropriate.

The other configuration, function, and effects of the second embodiment are the same as those of the first embodiment.

The present invention is not limited to the foregoing embodiments, and various modifications may be made thereto. For example, when a not-shown control unit provided outside the angle sensor 1 can recognize the angle θ to be detected, the correction information determination unit 35 or 135 may generate an estimated indicator value by using, as "another variable" of the function $z^T X$, the angle θ recognized by the control unit, instead of the detected angle value θs. Such a situation occurs when, for example, the control unit commands to change the angle θ, or when the control unit is able to obtain information about the angle θ.

Further, in the present invention, the adaptive signal processing may use an algorithm other than the RLS algorithm, such as a least mean square (LMS) algorithm.

The present invention is applicable not only to magnetic angle sensors but to all types of angle sensors including optical angle sensors.

Obviously, many modifications and variations of the present invention are possible in the light of the above teachings. Thus, it is to be understood that, within the scope of the appended claims and equivalents thereof, the invention may be practiced in other embodiments than the foregoing most preferable embodiments.

What is claimed is:

1. A correction apparatus for use in a sensor for detecting a magnetic field whose direction rotates, the sensor including: a detection signal generation unit for generating a plurality of detection signals each having a correspondence with the direction of the magnetic field; and a detection unit for generating a detection value on the basis of the plurality of detection signals, the detection value having a correspondence with the direction of the magnetic field, the correction apparatus comprising:
a correction processing unit configured to receive the plurality of detection signals and to perform correction processing on the plurality of detection signals to reduce an error of the detection value relative to the case where the correction processing is not performed, details of the correction processing being determined according to correction information;
an indicator value generation unit configured to receive the plurality of detection signals and to generate an indicator value on the basis of the plurality of detection signals, the indicator value having a correspondence with the error of the detection value; and a correction information determination unit configured to: receive the indicator value; generate an estimated indicator value, which is an estimated value of the indicator value, using a function that takes one or more values each having a correspondence with the correction information as one or more variables; determine the correction information by adaptive signal processing so as to reduce a difference between the indicator value and the estimated indicator value; and supply the correction information to the correction processing unit, wherein the estimated indicator value is generated by assigning estimated values of the one or more values each having the correspondence with the correction information to the one or more variables of the function, and the correction processing unit converts, by the correction processing, the plurality of detection signals into a plurality of computation signals that are to be used for computing the detection value at the detection unit, and supplies the plurality of computation signals to the detection unit.

2. The correction apparatus according to claim 1, wherein the function that the correction information determination unit uses to generate the estimated indicator value is a function that takes the detection value as another variable.

3. The correction apparatus according to claim 1, wherein the plurality of detection signals are a first detection signal and a second detection signal, when the direction of the magnetic field varies with a predetermined period, the first detection signal contains a first ideal component, and the second detection signal contains a second ideal component, and the first ideal component and the second ideal component vary periodically in such a manner as to trace an ideal sinusoidal curve with a phase difference of 90° between the first and second ideal components.

4. The correction apparatus according to claim 3, wherein the indicator value generation unit generates the indicator value by performing operations including an operation to obtain a square root of a sum of a square of the first detection signal and a square of the second detection signal.

5. The correction apparatus according to claim 1, wherein the plurality of computation signals are a first computation signal and a second computation signal, and the indicator value generation unit generates the indicator value by performing operations including an operation to obtain a square root of a sum of a square of the first computation signal and a square of the second computation signal.

6. The correction apparatus according to claim 1, wherein the adaptive signal processing uses a recursive least square algorithm.

7. The correction apparatus according to claim 1, wherein the detection value is an angle detection value having a correspondence with an angle that the direction of the magnetic field at a reference position forms with respect to a reference direction.

8. The correction apparatus according to claim 1, wherein a variation range of the direction of the magnetic field is less than 360°.

9. The correction apparatus according to claim 1, wherein the magnetic field is one generated by a magnet configured so that its relative positional relationship with the sensor varies.

10. The correction apparatus according to claim 9, wherein at least one of the sensor or the magnet rotates.

11. The correction apparatus according to claim 9, wherein the magnet is a magnetic scale, and at least one of the sensor or the magnetic scale moves linearly.

12. A sensor for detecting a magnetic field whose direction rotates, comprising:

a detection signal generation unit for generating a plurality of detection signals each having a correspondence with the direction of the magnetic field;

a detection unit for generating a detection value on the basis of the plurality of detection signals, the detection value having a correspondence with the direction of the magnetic field; and the correction apparatus according to claim 1.

* * * * *